United States Patent Office.

GEORG KALISCHER, OF FRANKFORT-ON-THE-MAIN, GERMANY, ASSIGNOR TO LEOPOLD CASSELLA & CO., OF SAME PLACE.

BLACK DYE AND PROCESS OF MAKING SAME.

SPECIFICATION forming part of Letters Patent No. 610,541, dated September 13, 1898.

Application filed January 3, 1898. Serial No. 665,444. (Specimens.)

*To all whom it may concern:*

Be it known that I, GEORG KALISCHER, a citizen of Prussia, and a resident of Frankfort-on-the-Main, Germany, have invented certain new and useful Improvements in the Production of a Black Cotton Dyestuff, of which the following is a specification.

I have found that a new black dyestuff of excellent properties is obtained by heating oxydinitrodiphenylamin with sulfids of alkalies and sulfur in aqueous solution. The thus obtained dyestuff dyes cotton direct deep blue-black shades, which are fast to rubbing, to light, and absolutely fast to washing and milling. The product from which I start is obtained by allowing 1.3 dinitro 4 chlorbenzene to react on paraämidophenol in a manner that only the amido group is substituted. The formation of oxydinitrodiphenylamin takes place, for instance, very readily if the components are allowed to react upon each other in spirit solution in molecular proportion in presence of acetates.

In order to carry out my invention, I proceed, for instance, as follows: Fifteen parts, by weight, of oxydinitrodiphenylamin are gradually heated to about 140° centigrade, together with seventy-five parts, by weight, of crystallized sulfid of sodium and thirty parts, by weight, of sulfur in presence of a little water. This temperature is maintained for several hours until the mass is almost completely dry. Then it is heated for a short time to about 160° centigrade in order to remove the last trace of water. The dyestuff is thus obtained direct in a soluble form and in a state ready for technical use. From its solutions it is precipitated by acids and can thus be isolated and obtained in a pure state.

Instead of using the dinitro compound, which is reduced by the sulfid in the first phase of the reaction, I may also employ the nitroamido or diamido compound, obtained by previously reducing the oxydinitrodiphenylamin.

Having thus described my invention and in what manner the same can be performed, what I claim as new, and desire to secure by Letters Patent, is—

1. The process of producing a black coloring-matter by heating the oxydinitrodiphenylamin of the constitution:

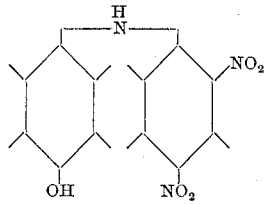

with sulfids and sulfur substantially as described.

2. The black coloring-matter derived from oxydinitrodiphenylamin and sulfur, which is a black mass, easily soluble in water with a blue-black color being precipitated from its solutions by acids and dyeing unmordanted cotton directly in an alkaline bath without the help of oxidizing agents a deep blue-back substantially as described.

In testimony that I claim the foregoing as my invention I have signed my name, in presence of two witnesses, this 18th day of December, 1897.

GEORG KALISCHER.

Witnesses:
 JACOB WERNER,
 R. BLANK.